United States Patent
Fuchs et al.

(10) Patent No.: US 12,027,311 B2
(45) Date of Patent: Jul. 2, 2024

(54) ACTUATING DEVICE

(71) Applicant: HYDAC FLUIDTECHNIK GMBH, Sulzbach/Saar (DE)

(72) Inventors: Patrik Fuchs, Kirkel (DE); Maurizio Spina, Saarbrücken (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 99 days.

(21) Appl. No.: 17/766,776

(22) PCT Filed: Oct. 6, 2020

(86) PCT No.: PCT/EP2020/077996
§ 371 (c)(1),
(2) Date: Apr. 6, 2022

(87) PCT Pub. No.: WO2021/069439
PCT Pub. Date: Apr. 15, 2021

(65) Prior Publication Data
US 2023/0162901 A1    May 25, 2023

(30) Foreign Application Priority Data
Oct. 9, 2019    (DE) .................... 10 2019 006 999.4

(51) Int. Cl.
H01F 7/126    (2006.01)
F16K 31/06    (2006.01)
(Continued)

(52) U.S. Cl.
CPC ......... H01F 7/126 (2013.01); F16K 31/0675 (2013.01); H01F 7/081 (2013.01); H01F 7/121 (2013.01)

(58) Field of Classification Search
CPC ...... F16K 31/0675; H01F 7/126; H01F 7/081; H01F 7/121; H01F 7/128; H01F 27/025
See application file for complete search history.

(56) References Cited

U.S. PATENT DOCUMENTS

| | | |
|---|---|---|
| 3,551,862 A | 12/1970 | Haug |
| 2003/0137378 A1 | 7/2003 | Parker et al. |

(Continued)

FOREIGN PATENT DOCUMENTS

| | | |
|---|---|---|
| DE | 1 972 124 | 11/1967 |
| DE | 10 2004 051 332 | 4/2006 |

(Continued)

OTHER PUBLICATIONS

Technisches Datenblatt PA 6 von Polymehr GmbH vom, Jan. 1, 2015, cited in the German Office Action.

(Continued)

Primary Examiner — Matthew W Jellett
(74) Attorney, Agent, or Firm — WENDEROTH, LIND & PONACK, L.L.P.

(57) ABSTRACT

An actuating device includes at least one magnetic drive (12) with a solenoid coil (34) accommodated in a housing (10). The solenoid coil generates heat during operation affecting the performance of the device. The heat is dissipated at least partially into the environment as power loss via the housing (10), is disclosed. For improved heat dissipation, parts (40, 42) of the device are formed of at least one special plastic material, which has a thermal conductivity coefficient of 0.25 to 1.25 W/(m·K) or W/m/K (i.e., watts per meter per Kelvin).

26 Claims, 1 Drawing Sheet

(51) Int. Cl.
H01F 7/08 (2006.01)
H01F 7/121 (2006.01)

(56) References Cited

U.S. PATENT DOCUMENTS

| | | | |
|---|---|---|---|
| 2010/0156580 A1* | 6/2010 | Bill | A62C 3/16 |
| | | | 335/219 |
| 2011/0049405 A1* | 3/2011 | Bill | H01F 7/1607 |
| | | | 251/129.15 |
| 2011/0068286 A1* | 3/2011 | Nomichi | F16K 31/0655 |
| | | | 251/129.15 |
| 2012/0242437 A1* | 9/2012 | Buse | F16K 31/0675 |
| | | | 335/298 |
| 2017/0314700 A1* | 11/2017 | Iwanaga | F16K 27/048 |

FOREIGN PATENT DOCUMENTS

| | | |
|---|---|---|
| DE | 10 2007 036 310 | 2/2009 |
| DE | 10 2008 030 453 | 1/2010 |
| DE | 10 2011 02 129 | 11/2012 |
| DE | 10 2014 008 612 | 3/2016 |
| DE | 10 2017 110 849 | 11/2018 |

OTHER PUBLICATIONS

International Search Report (ISR) issued Dec. 22, 2020 in International (PCT) Application No. PCT/EP2020/077996.

* cited by examiner

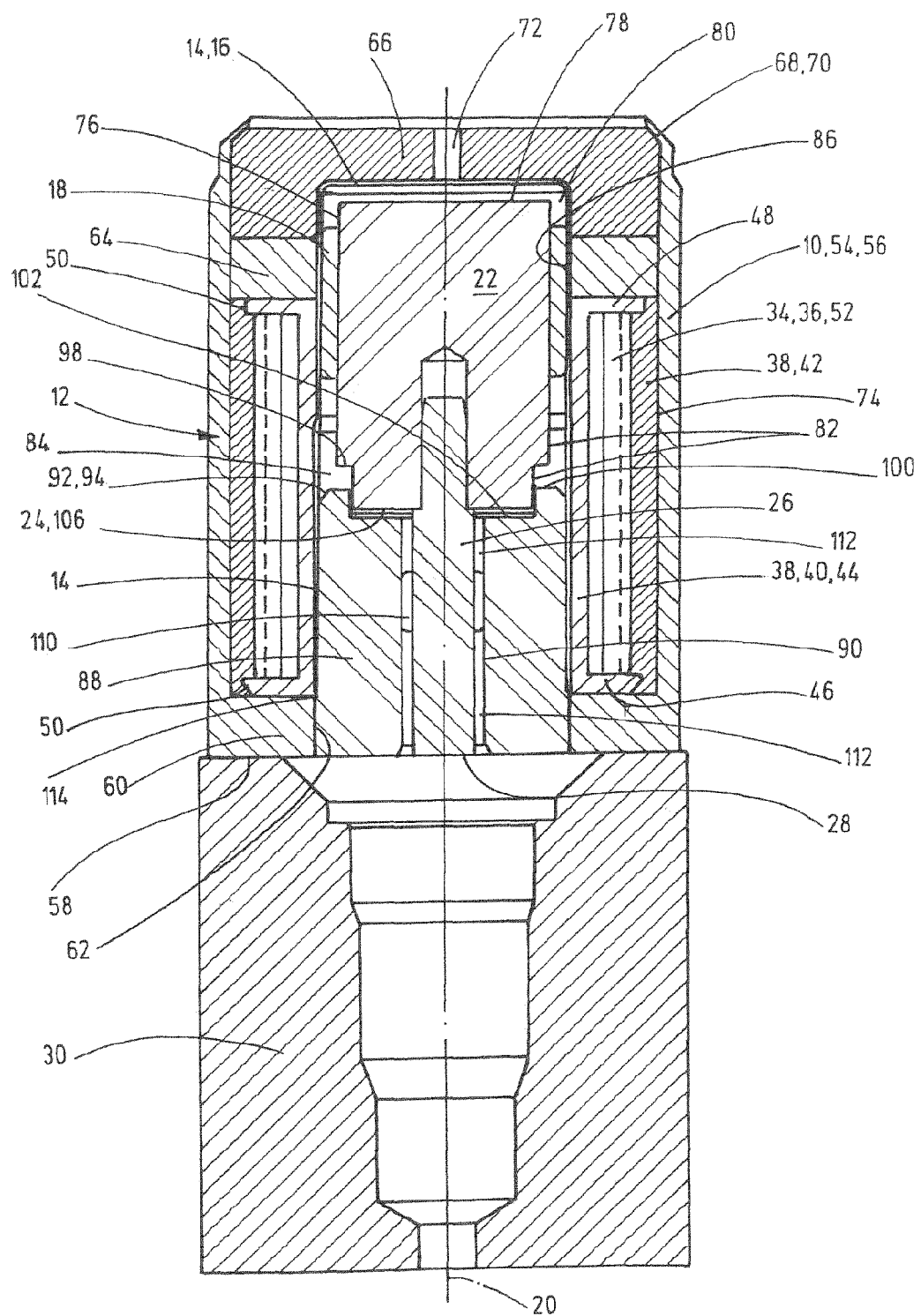

ACTUATING DEVICE

FIELD OF THE INVENTION

Actuating devices typically having the form of actuating solenoids are known in a plurality of different designs (e.g., DE 10 2004 051 332 A1). Such devices are regularly used to control fluid valves and are equipped in a known manner with a magnetic drive having an energizable solenoid coil.

BACKGROUND OF THE INVENTION

During operation, the coil or the magnetic drive heats up. The heat is dissipated to the environment as power loss, and the performance of the actuating device is reduced because of the heat. If metallic materials are used for the actuating device, they regularly have very high thermal conductivity coefficients, to rapidly dissipate the heat generated into the environment, which contributes to reducing any power losses. In addition to the fact that the use of metallic materials and their shaping is cost-intensive, their use in the context of current-conducting and current-carrying components such as the power supply or the solenoid coil with its coil windings is not feasible owing to a lack of insulation. Accordingly, increasingly the use of plastic materials has already been proposed in the prior art (DE 10 2014 008 612 B4) for actuating devices of the type mentioned, for the purpose of electrically insulating the current-carrying components and cost-effectively producing a necessary housing for the magnetic drive. However, the thermal conductivity is reduced by the use of the plastic materials mentioned, so that this design is not feasible in particular for magnetic drives having a lot of power and a small size at the same time.

SUMMARY OF THE INVENTION

Accordingly, the invention addresses the problem of providing a high-performance actuating device in the most cost-effective manner possible, even for small sizes.

An actuating device according to the invention solves this problem.

According to the invention, provision is made for improved heat dissipation by parts of the device having at least one special plastic material having a thermal conductivity coefficient between 0.25 and 1.25

$$\frac{W}{m \cdot K}.$$

or W/m/K (i.e., watts per meter per Kelvin).

The use of the special plastic material having the specified low thermal conductivity coefficient provides, on the one hand, electrical insulation for the current-carrying components of the magnetic drive and the solenoid coil and, on the other hand, a high heat dissipation rate similar to that of metallic materials to the environment, which counteracts undesirable heating caused by the heat generated remaining in the device during the solenoid coil's operation, improving performance in that way.

Particularly in the case of actuating devices or actuating solenoids, which have to apply high actuating or switching forces at a small size and/or are designed as fast-switching systems with a high number of load cycles, rapid heat dissipation of large amounts of heat to the environment plays a major role for their functionality.

It has been shown that the solenoid coil having the energizable coil winding is the main heat source during operation. In an advantageous manner the coil winding is accommodated in an enclosure, which at least partially, but preferably completely, comprises the respective special plastic material. Practical tests using the solution according to the invention have shown that although the core of the solenoid coil still heats up intensely in operation, the resulting heat quantities are rapidly dissipated from the core of the solenoid coil via the respective special plastic material, leading to significantly improved performance results compared to the known solutions, which are predominantly constructed from metal materials and/or the usual plastic materials.

In a particularly preferred embodiment of the actuating device according to the invention, provision is made for the enclosure for the coil winding of the solenoid coil to be a winding receiving part and a cover part closing the winding receiving part. Also, both parts are made up of the same special plastic material. In this way, starting from the inside of the solenoid coil and moving outwards, there is a layered decrease of the temperature having a uniform gradient, more or less on all sides of the winding receiving part having the cover part. It is further advantageous for the temperature decrease if the winding receiving part and the cover part have largely the same wall thicknesses.

For improved heat dissipation, it has also proved advantageous that a perimeter sleeve of the magnetic drive adjoins to the winding receiving part of the enclosure in the direction of the magnetic drive and an outer housing part of the device housing adjoins to the cover part of the enclosure in the direction of the surroundings. A circumferential annular gap is accommodated between the inner wall of this outer housing part and the outer wall of the cover part. It is still within the scope of the invention in special applications for the actuating device to provide the annular gap with a cooling medium, which may originate from a cooling circuit.

Preferably, at its free, opposite ends the annular gap is then delimited by a pole plate and by the outer housing part, between which the winding receiving part for the coil winding extends, arranged concentrically to the annular gap. Both the pole plate and the outer housing part are preferably made of a metallic material having a good thermal conductivity. For good heat dissipation, the preferred formation is also that the magnetic drive has a magnet armature that is guided in a longitudinally movable manner along a bearing point that is accommodated stationarily within the perimeter sleeve. The perimeter sleeve penetrates the pole plate together with the magnet armature at a passage point of the pole plate. By the bearing point for the magnet armature, a cavity surrounding the magnet armature is formed between the armature and the perimeter sleeve. That cavity is kept free of material and in that way supports the desired improved heat dissipation towards the inside.

A further component of the magnetic drive, a pole core is penetrated by an actuating element guided along a further bearing point and arranged stationarily in the pole core. In this way, too, a cavity is created via the further bearing point between the actuating element, typically having the form of an actuating rod for the valve piston of a fluid valve to be connected. The pole core facilitates heat dissipation from the coil system in the direction of its center. To achieve heat flows in the direction of the pole core, it is advantageous for the free end of the perimeter sleeve to open out at the level of the pole core, at which the one free end of the winding receiving part for the coil winding abutting the outer housing part terminates. It is particularly advantageous if the pole plate, the pole core, the perimeter sleeve and the outer housing part are formed of metal materials having a good thermal conductivity. In addition to stainless steel material for the outer sleeve, free-cutting steels (11SMn30) are suitable for the other components mentioned, as they are easy to process, in particular are formable it the desired shape.

In a preferred embodiment of the actuating device according to the invention, provision is made for the housing part to form a receiving cup. The bottom of the receiving cup has a penetration space for the pole core to penetrate. The bottom of the housing part is to be preferably thicker than the adjoining cylindrical housing shell of the housing part. This structure makes for a particularly simple assembly of the actuating device, in which the relevant components can be stacked from the free front face into the cup-shaped housing part, which forms a kind of mounting space in this way.

In a further, particularly preferred embodiment of the actuating device according to the invention, provision is made for at least the solenoid coil and subsequently the pole plate to be accommodated in the receiving cup of the housing part from the receiving cup's free end face. The pole plate rests on a termination piece, which is held in the housing part at a predeterminable preload by a flared lap. In this way, the flared lap is used to keep the components accommodated in the housing part together using a predefinable contact pressure or preload to the specified extent, facilitating the heat transfer.

In a further preferred embodiment of the actuating device according to the invention, provision is made for the outer circumference of the enclosure of the solenoid coil to rest on the housing part, for the inner circumference of the enclosure to rest at least partially on the pole core and for the two opposite end faces of the enclosure to rest on the bottom of the housing part and on the pole plate, respectively. This arrangement also facilitates the heat transfer between the structural components mentioned above and achieves good heat dissipation, which also applies in the case where a pressure-resistant perimeter sleeve. The perimeter sleeve is preferably also equipped with good thermal conductivity and extends between internal parts of the enclosure and the adjacent opposite sections of the outer circumference of the pole core.

In a further preferred embodiment, the housing part forms the circumferentially closed housing shell, to the longitudinal axis of which at least the solenoid coil, the pole plate and the pole core are arranged concentrically in relation to each other. The concentric arrangement of essential components in the actuating device results in a space-saving construction in addition to a good heat transfer between the components.

In a further, particularly preferred embodiment of the actuating device according to the invention, provision is made for both the bottom of the housing part and the pole core to be in direct contact with the valve body, preferably flush with each other at their adjacent end faces. The valve body is preferably formed from a material having a high thermal conductivity coefficient, such as aluminum. In this respect, owing to the flush direct contact, the block-shaped valve body forms a heat reservoir to dissipate the heat generated during operation of the actuating device directly into the heat body used as a heat reservoir. In this respect, the valve body is a component of the actuating device as a whole.

The special plastic material is preferably injection-moldable, polyamide 6 material, which is preferably reinforced with 10% glass fiber content and which is available on the market under the brand names Radiflam or Zytel.

Preferably, provision is made for the respective special plastic material to be flame-retardant, in particular to be provided with flame-retardant additives, such as magnesium hydroxide and/or carbon. Particularly in the case of high-temperature stresses, the actuating device can be equipped with a type of fire extinguisher that helps to prevent a coil fire in the event of failure.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

The single FIGURE is side view in section of an actuating device with parts of a valve housing connected in the usual way, without the movable valve parts and without the fluid ports according to an exemplary embodiment of the invention.

DETAILED DESCRIPTION OF THE INVENTION

The single FIGURE shows an actuating device according to the invention having a magnetic drive 12 accommodated in a housing 10 of the device. The magnetic drive 12 has a perimeter sleeve 14 forming a pole tube. The perimeter sleeve 14 is mainly cylindrical and is closed at one end to form a bottom 16. A bearing point 18 is concentrically and stationarily accommodated within the perimeter sleeve 14. Along the bearing point 18, a magnet armature 22, as part of the magnetic drive 12, is guided in a longitudinally movable manner in the direction of the longitudinal axis 20 of the actuating device.

On its side 24 facing away from the bottom 16 of the perimeter sleeve 14, an actuating element 26, aligned coaxially with the magnet armature 22, is secured to the magnet armature 22. The free end 28 of the actuating element 26 facing away from the magnet armature 22, is used to actuate movable valve parts (not shown in the FIGURE) of a valve housing 30 to which the actuating device is connected. In this respect, the FIGURE only roughly shows the housing outlines. This valve structure is common and therefore not shown or described in any detail.

The magnetic drive 12 comprises a solenoid coil 34 having an energizable coil winding 36, to move the magnet armature 22 within the perimeter sleeve 14. The coil winding 36 is accommodated in an enclosure 38 having a winding receiving part 40 and a cover part 42 closing the winding receiving part 40. The winding receiving part 40 has a cylindrical bottom 44 and, at both ends of the bottom 44, an annular disc-shaped wall 46, 48 extending perpendicularly radially outwardly from the bottom 44, each. The two annular disc-shaped walls 46, 48, which are aligned in parallel to each other, together with the bottom 44 of the winding receiving part 40 form a kind of trough for accommodating the coil winding 36. The cover part 42, which is formed cylindrically, encompasses the winding receiving part 40 and is connected to the free ends 50 of the annular walls 46, 48 such that the winding receiving part 40 and the cover part 42 delimit a cylindrical space 52 for receiving the coil winding 36 of the solenoid 34. The coil winding 36 contacts the inside of the winding receiving 40 and the inside of the cover part 42 essentially without forming a gap.

The winding receiving part 40 encompasses essential parts of the magnetic drive 12. The cup-shaped perimeter sleeve 14 forming the pole tube, of the magnetic drive 12, adjoins to the winding receiving part 40 of the enclosure 38 in the direction of the longitudinal axis 20 of the actuating device, i.e. radially inwards.

An outer housing part 54 of the device housing 10 adjoins to the cover part 42 of the enclosure 38 in the direction of the surroundings. The device housing 10 encompasses the magnetic drive 12, in particular the enclosure 38. The outer housing part 54 has a cylindrical main housing part 56. An annular disc-shaped projection 60 extends perpendicularly radially inwards away from the end 58 of the main body part 56 facing the valve body 30. The free end 62 of the projection 60 as the bottom of a receiving cup formed in this way, in the radial direction mainly ends lined up with the side of the bottom 44, facing the perimeter sleeve 14, of the winding receiving part 40. The annular wall 46, facing the valve body 30 of the winding receiving part 40, contacts the projection 60. An annular disc-shaped pole plate 64 encompasses the perimeter sleeve 14 and adjoins the winding receiving part 40 and the cover part 42 on the side facing away from the valve body 30 of the annular wall 48 facing away from the valve body 30 of the winding receiving part 40.

The device housing 10 further comprises a termination piece 66, which is inserted into the cylindrical main housing part 56 from the side 68 facing away from the valve body 30 of the main housing part 56 and is mounted in the main housing part 56 by a circumferential flared lap 70. The termination piece 66 has a central through hole 72.

The main housing part 56 is spaced apart from the cover part 42 of the enclosure 38 such that a circumferential annular gap 74 is formed between the inner wall of the main housing part 56 and the outer wall of the cover part 42. Through the annular gap 74, a further cylindrical space is formed in the device housing 10. The annular gap 74 is co-delimited at its free, opposite axial ends by the pole plate 64 and by the projection 60 of the outer housing part 54, respectively. The winding receiving part 40, the cover part 42, and the annular gap 74 extend between the pole plate 64 and the projection 60 of the outer housing part 54. The winding receiving part 40 and the cover part 42 are disposed to be concentric with the annular gap 74.

The bearing point 18 of the magnet armature 22 encompasses the magnet armature 22 starting from its central section in the direction of the end section 76 facing away from the valve body 30 of the magnet armature 22 over a distance which, viewed in the longitudinal direction of the magnet armature 22, equals approximately half the height of the magnet armature 22. As a result, the end section 76 facing away from the valve body 30 of the magnet armature circumference and the front face 78 facing away from the valve body 30 of the magnet armature circumference are spaced apart from the perimeter sleeve 14, while forming a cavity 80. A section 82 facing towards the valve body 30 of the magnet armature circumference is also spaced apart from the perimeter sleeve 14 while forming a further cavity 84.

The perimeter sleeve 14, the bearing point 18 and the magnet armature 22 pass through the pole plate 64 at a passage point 86 of the pole plate 64.

Further provided as part of the magnetic drive 12 is a pole core 88 having a centrally extending bore 90 through which the actuating element 26 extends. At its outer circumference in its end section 92 facing the magnet armature 22, the annular diameter 94 of the pole core 88 decreases, tapering in the direction of the magnet armature 22. As stated above, the housing part 54 forms a kind of receiving cup, the bottom 60 of which has a penetration space for a central penetration of the pole core 88. The bottom 60 of the housing part 54 is preferably thicker than the adjoining cylindrical housing shell of the housing part 54 to allow good heat dissipation via the bottom 60 in the direction of the block-shaped valve body 30.

At least the solenoid coil 34 and then the pole plate 64 are received from the free end face of the receiving cup of the housing part 54. The pole plate 64 rests on a termination piece 66, which is held in the housing part 54 at a predeterminable preload by a flared lap 70. Furthermore, the outer circumference of the enclosure 38 of the solenoid coil 34 is supported by the housing part 54, the inner circumference of the enclosure 38 of the solenoid coil 34 is supported by at least partially the pole core 88, and the two opposite end faces of the enclosure 38 are supported by the bottom 60 of the housing part 54 and on the pole plate 64, respectively. The shell of the perimeter sleeve 14, extending between the enclosure 38 and the pole core 88, does not prevent effective support. The housing part 54 forms a closed housing shell on the circumference, to the longitudinal axis of which closed housing shell at least the solenoid coil 34 together with the pole plate 64 and the pole core 88 are arranged concentrically in relation to one another. This results in a compact structure with good heat transfer between the components mentioned above.

As shown in particular in the FIGURE, the actuating device is provided with both the bottom 60 of the housing part 54 and the pole core 88 ending preferably flush with each other at their adjacent end faces in direct abutment with the valve body 30, which is preferably formed of a material having a high thermal conductivity coefficient, such as aluminum. In particular, the valve body 30 is formed as a metal block forming a kind of heat accumulator in this respect. When viewed in the direction of the FIGURE, the lower side of the bottom 60 terminates with the lower side of the pole core 88 in a joint plane extending transverse to the longitudinal axis of the housing part 54.

The maximum outer diameter of the magnet armature 22, which has a diameter reduction at its end section 82 facing the valve body 30, to form an annular step 98, is dimensioned smaller than the minimum outer diameter of the pole core 88. From the end face 100 facing the magnet armature 22 of the pole core 88, a cylindrical recess 102, formed coaxially with the longitudinal axis 20 of the actuating device, is inserted into the pole core 88. On the annular side wall of the recess 102, the stepped end section 82 facing the pole core 88 of the magnet armature circumference is guided at a reduced diameter. To this end, the magnet armature 22 and the pole core 88 are formed in such a way that, when the magnet armature 22 moves in the direction of the pole core 88, the end face 106 facing the pole core 88 of the magnet armature 22 comes into contact with the bottom of the cylindrical recess 102. At the same time the annular step 98 of the magnet armature 22 remains at a distance from the end face 100 facing the magnet armature 22, of the pole core 88.

The actuating element 26 is guided along a further bearing point 110. The further bearing point 110 is concentrically and stationarily accommodated inside the drilled hole 90 of the pole core 88 and encompasses the actuating element 26 in its central section over a distance, which, viewed in the longitudinal direction of the actuating element 26, equals approximately one quarter to one fifth of the length of the actuating element 26 between the front face 106 facing the valve body 30 of the magnet armature 22 and the free end 28 of the actuating element 26. As a result, the actuating element 26 is spaced apart from the pole core 88 outside of the further bearing point 110 to form two further cavities 112 in the device housing 10.

The free end 114 of the perimeter sleeve 14 ends at the height of the side facing away from the valve body 30 of the projection 60 of the outer housing part 54, at which the winding receiving part 40 for the coil winding 38 terminates with the outside of its annular wall 46 facing the valve body 30.

In actuating devices known from the prior art, the magnetic drive, in particular the coil winding, heats up during operation when the coil winding is energized reducing the performance of the actuating device due to the heat. The heat is dissipated as power loss to the surroundings of the coil winding. According to Ohm's law, the thermal power dissipated by the coil winding as a power loss depends on the electric current flowing through the coil winding and on the resistance value of the coil winding, which in turn depends on the material, cross-section and length of the conductor of the coil winding.

If metallic materials are used for the actuating device, they regularly have very high thermal conductivity coefficients to rapidly dissipate the heat generated into the environment of the actuating device contributing to reducing any power losses. In addition to the fact that the use of metallic materials and their shaping is cost-intensive, their use in the context of current-conducting and current-carrying components such as the power supply or the solenoid coil with its coil windings is not feasible owing to a lack of insulation. Electrically insulating components enclosing the coil winding, are therefore regularly made of plastic material having a rather poor thermal conductivity coefficient, which means that heat cannot be optimally dissipated from the coil winding.

According to the invention, therefore, for improved heat dissipation, parts of the actuating device are formed of at least one special plastic material having a thermal conductivity coefficient of 0.25 to 1.25

$$\frac{W}{m \cdot K}.$$

or W/m/K (i.e., watts per meter per Kelvin). Thus, the enclosure 38, in which the coil winding 36 is accommodated, comprises at least partially the relevant special plastic material, namely, the winding receiving part 40 and/or the cover part 42 are made from a special plastic material, in particular either from the same or from different special plastic materials.

The respective special plastic material is made from, preferably injection-moldable, polyamide 6 material reinforced having a glass fiber content of 5% to 25%, preferably of 10%. In addition, the respective special plastic material is flame-retardant, in particular provided with flame-retardant additives. Such flame-retardant additives are, for instance, magnesium hydroxide and/or carbon.

The cavities 80, 84, 112 contribute to improving the heat dissipation to the interior.

In addition, the pole plate 64, the pole core 88, the perimeter sleeve 14 and the outer housing part 54 are formed of metal materials having a good thermal conductivity, such as 11SMn30 or stainless steel 1.4301 and 1.4305. Also, the valve body 30 may be formed at least partially of metal, particularly preferably of aluminum, having a high thermal conductivity coefficient. The bearing points 18, 110 for the magnet armature 22 and the actuating rod 26 are formed in particular of sintered bronze.

Such a design of the actuating device according to the invention, and in particular of the valve body 30, makes for a particularly good dissipation of the heat of the actuating device to its environment.

While one embodiment has been chosen to illustrate the invention, it will be understood by those skilled in the art that various changes and modifications can be made therein without departing from the scope of the invention as defined in the claims.

The invention claimed is:

1. An actuating device, comprising:
 a housing part having an annular housing outer end surface of a housing surrounding surface of the housing part;
 at least one magnetic drive with a solenoid coil being accommodated in the housing part generating heat during operation affecting performance of the actuating device with the heat being able to be dissipated at least partially into an environment outside of the housing part as power loss via the housing part; and
 a valve body being a metal block forming a heat accumulator and having a thermal conductivity coefficient and an annular body outer end surface of a body surrounding surface of the valve body, facing portions of the annular housing outer end surface and the annular body outer end surface being in direct surface-to surface contact from an outer edge of the housing part inwardly providing a heat conducting connection between the housing part and the valve body, an entirety of each of the annular housing outer end surface and the annular body outer end surface extending in a single plane.

2. The actuating device of claim 1 wherein
 the housing part has a receiving cup;
 the solenoid coil is accommodated in in the receiving cup;
 a pole plate is accommodated in the receiving cup of the housing part at a location spaced a greater distance from the annular housing outer end surface of the housing part than the solenoid coil;
 a termination piece is accommodated in the receiving cup of the housing part at a location spaced a greater distance from the annular housing outer end surface of the housing part than the solenoid coil and the pole plate and supporting the pole plate such that a stack of the solenoid coil, the pole plate and the termination piece in that order is in the housing part;
 a flared lap bent at the distal free end face of the housing part applying a predeterminable preload on the termination piece.

3. The actuating device according to claim 2 wherein
 the housing part forms a circumferentially closed housing shell with a shell longitudinal axis, at least the solenoid coil, the pole plate and a pole core of the magnetic drive being arranged concentrically in relation to one another along the shell longitudinal axis.

4. The actuating device according to claim 2 wherein
 the housing part having the receiving cup comprises a bottom with a penetration space receiving a pole core of the magnetic drive, the bottom of the housing part being thicker than an adjoining cylindrical housing shell of the housing part.

5. The actuating device according to claim 4 wherein
an outer circumference of an enclosure receiving the solenoid coil is supported by the housing part, an inner circumference of the enclosure being supported at least partially on the pole core and two mutually opposite end faces of the enclosure being supported by the bottom of the housing part and by the pole plate, respectively.

6. The actuating device of claim 2 wherein
the pole plate and the termination piece are entirely within the housing part.

7. The actuating device of claim 2 wherein
the solenoid coil comprises an energizable coil winding accommodated in an enclosure formed, at least in part, of the special plastic material.

8. The actuating device according to claim 7 wherein
the enclosure for the coil winding of the solenoid coil comprises a winding receiving part and a cover part closing the winding receiving part, at least one of the winding receiving part and the cover part being formed of the special plastic material.

9. The actuating device according to claim 8 wherein
a perimeter sleeve adjoins the winding receiving part of the enclosure in a direction of a longitudinal axis of the actuating device;
an outer housing part of the housing part adjoins the cover part of the enclosure in a direction of surroundings of the actuating device; and
a circumferential annular gap is located between an inner wall of the outer housing part and an outer wall of the cover part.

10. The actuating device according to claim 9 wherein
at free opposite ends of the annular gap, the annular gap is delimited by the pole plate and by the outer housing part, with the winding receiving part extending between the pole plate and the outer housing part and being arranged concentrically to the annular gap.

11. The actuating device according to claim 9 wherein
the magnetic drive has a magnet armature guided in a longitudinally movable manner along a first bearing point accommodated stationarily within the perimeter sleeve, the perimeter sleeve passing through the pole plate together with the magnet armature at a passage point of the pole plate.

12. The actuating device according to claim 11 wherein
a pole core is provided as a further component of the magnetic drive, the pole core being penetrated by an actuating element guided along a second bearing point arranged stationarily in the pole core.

13. The actuating device according to claim 11 wherein
the pole plate, the pole core, the perimeter sleeve and the outer housing part are formed of metal materials having a good thermal conductivity.

14. The actuating device of claim 1 wherein
the metal block is aluminum.

15. The actuating device of claim 1 wherein
the housing part has a projection thicker than other parts of the housing part at an end of the housing part adjacent the valve body.

16. The actuating device according to claim 1 wherein
for improved heat dissipation, parts of the housing are of at least one special plastic material having a thermal conductivity coefficient of 0.25 to 1.25 watts per meter per Kelvin.

17. The actuating device according to claim 16 wherein
the enclosure for the coil winding of the solenoid coil comprises a winding receiving part and a cover part closing the winding receiving part, both of the winding receiving part and the cover part being formed of the special plastic material.

18. The actuating device according to claim 17 wherein
the special plastic material of each of the winding receiving part and a cover part is a same special plastic material.

19. The actuating device according to claim 16 wherein
the special plastic material is an injection-moldable, polyamide 6 material reinforced with 5 to 25% glass fiber content.

20. The actuating device according to claim 16 wherein
the special plastic material is an injection-moldable, polyamide 6 material reinforced with 10% glass fiber content.

21. The actuating device according to claim 16 wherein
the special plastic material is flame-retardant with flame-retardant additives.

22. The actuating device according to claim 21 wherein
the flame-retardant additives comprise magnesium hydroxide and/or carbon.

23. The actuating device according to claim 1 wherein
a pole core of the magnetic drive is in direct contact with the valve body.

24. An actuating device, comprising:
a housing part;
at least one magnetic drive with a solenoid coil being accommodated in the housing part; and
for improved heat dissipation, an enclosure of the housing part being of at least one special plastic material having a thermal conductivity coefficient of 0.25 to 1.25 watts per meter per Kelvin, the solenoid coil winding being accommodated in the enclosure, the enclosure for the solenoid coil including a winding receiving part and a cover part closing the winding receiving part, both of the winding receiving part and the cover part being formed of the special plastic material, the winding receiving part being formed of a first special plastic material, the cover part being formed of a second special plastic material, the first and second special plastic materials being different plastic substances.

25. The actuating device according to claim 24 wherein
a pole plate is accommodated in the housing part at a location spaced a greater distance from an annular housing outer end surface of the housing part than the solenoid coil;
a termination piece is accommodated in the housing part at a location spaced a greater distance from the annular housing outer end surface of the housing part than the solenoid coil and the pole plate and supporting the pole plate such that a stack of the solenoid coil, the pole plate and the termination piece in that order is in the housing part;
a flared lap bent at the distal free end face of the housing part applying a predeterminable preload on the termination piece; and
a valve body being a metal block forming a heat accumulator and having a thermal conductivity coefficient and an annular body outer end surface of a body surrounding surface of the valve body, facing portions of the annular housing outer end surface and the annular body outer end surface being in direct contact providing a heat conducting connection between the housing part and the valve body.

26. An actuating device, comprising:
a housing part having a receiving cup with a free end face and with a longitudinal axis;

at least one magnetic drive with a solenoid coil being accommodated in in the receiving cup of the housing part generating heat during operation affecting performance of the actuating device with the heat being able to be dissipated at least partially into an environment outside of the housing part as power loss via the housing part;

a pole plate being accommodated in the receiving cup of the housing part at a location spaced a greater distance from the free end face than the solenoid coil;

a termination piece being accommodated in the receiving cup of the housing part at a location spaced a greater distance from the free end face than the solenoid coil and the pole plate and supporting the pole plate such that a stack of the solenoid coil, the pole plate and the termination piece in that order is in the housing part; and a central hole extending through the termination piece along the longitudinal axis.

\* \* \* \* \*